Oct. 30, 1951     L. P. C. J. DUDLEY     2,572,994
MOUNTING FOR CAMERAS
Filed June 22, 1949     3 Sheets-Sheet 1
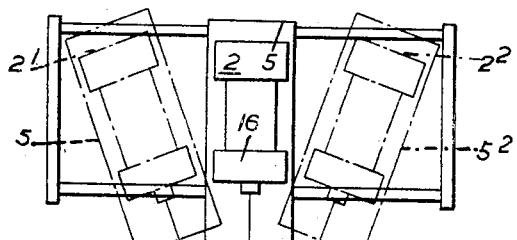
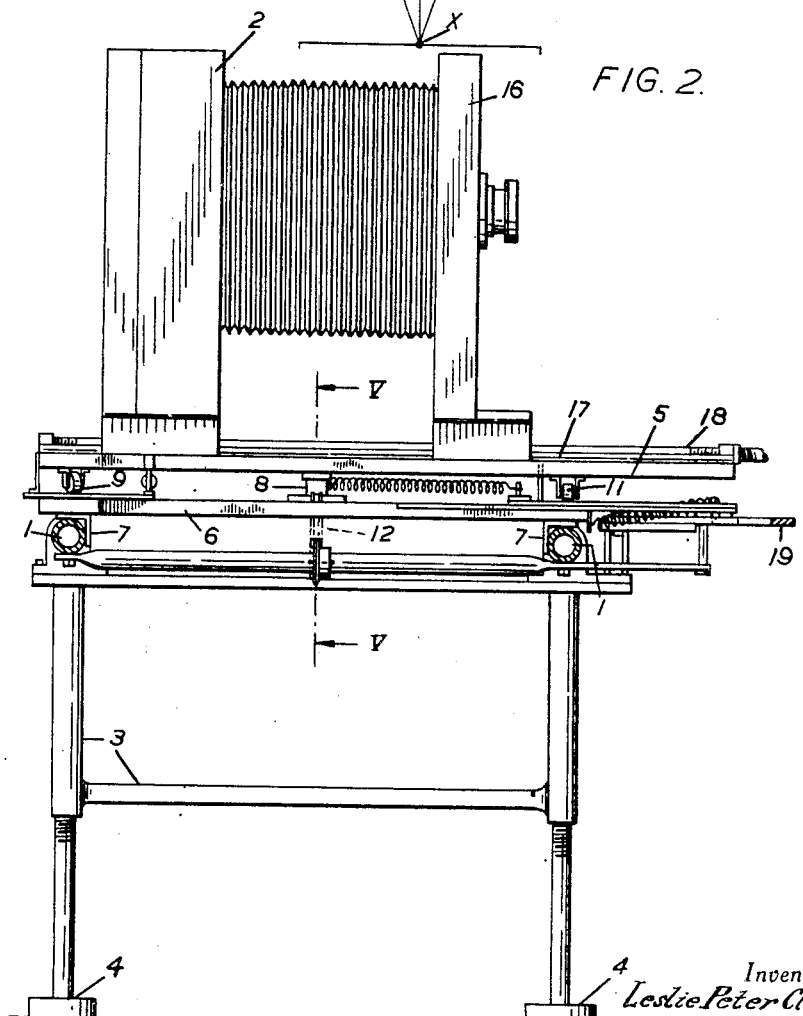
Inventor
Leslie Peter Clarence
Jack Dudley
By Bacon + Thomas
Attorneys Oct. 30, 1951 L. P. C. J. DUDLEY 2,572,994
MOUNTING FOR CAMERAS
Filed June 22, 1949 3 Sheets-Sheet 2

Inventor
Leslie Peter Clarence Jack Dudley
By Bacon + Thomas
Attorneys

Oct. 30, 1951     L. P. C. J. DUDLEY     2,572,994

MOUNTING FOR CAMERAS

Filed June 22, 1949     3 Sheets-Sheet 3

*Inventor*
*Leslie Peter Clarence Jack Dudley*
By *Bacon + Thomas*
*Attorneys*

Patented Oct. 30, 1951

2,572,994

UNITED STATES PATENT OFFICE 2,572,994

MOUNTING FOR CAMERAS

Leslie Peter Clarence Jack Dudley, Twickenham, England

Application June 22, 1949, Serial No. 100,641
In Great Britain June 24, 1948

1 Claim. (Cl. 95—18)

This invention is concerned with improvements in or relating to mountings for cameras and has for one of its objects the provision of an improved mounting which enables a camera to be moved with respect to a subject to be photographed, e. g. for the purpose of recording different aspects thereof, whilst ensuring that the optical axis of the camera always lies on a line passing through the centre of interest or some other selected point in the scene in which the subject is disposed.

The necessity for moving a camera in the above indicated manner arises in many different circumstances, e. g. in the production of certain forms of stereoscopic pictures, and the present invention is particularly, though not necessarily exclusively, concerned with a mode of mounting a camera for use in producing stereoscopic photographs of the parallax panoramagram type. In the production of stereoscopic photographs of this kind it has been proposed to mount a camera on arcuate guide rails which are radiused about the centre of interest of the subject to be photographed but it will be understood that such a proposal is to a large extent impracticable as a given arrangement of guide rails is only suitable for photographing an object at a certain definite distance from the camera and any variation in that distance necessitates the provision of guide rails of different curvature.

According to the present invention there is provided a mounting for a camera, such mounting comprising a carriage disposed for linear movement with respect to a frame, support or the like, and a platform or the like mounted on said carriage and movable angularly about an axis at right-angles to the direction of the said linear movement, such platform or the like being adapted to carry the camera.

The aforesaid carriage may be caused to move laterally across the said frame, support or the like by any suitable mechanism, e. g. rack and pinion mechanism or chain and sprocket mechanism, and such mechanism may be actuated by hand or by motor as may be desired.

The required angular movement of the platform or the like may be generated automatically by the linear movement of the carriage or it may be generated independently of, but suitably correlated with, the said linear movement, so that throughout the whole of the range of linear movement the optical axis of a camera mounted on said platform or the like is always on a line passing through the centre of interest of the scene being photographed. Thus for instance, the mechanism provided for angularly moving the platform or the like may be driven by a motor having provision for attaining the required synchronism between the rate of angular movement of the platform or the like and the rate of linear movement of the carriage, or the angular movement of the platform or the like may be effected by mechanical transmission means, e. g. links, gearing, cam mechanism or the like, having provision for varying the extent of the angular movement of the platform or the like for any given increment of linear movement of the carriage.

It will be understood that as a result of moving a camera linearly and at the same time turning such camera angularly so that its optical axis lies on a line passing through a selected point in the subject there is a variation in the distance between the said point and the focal plane of the camera. In many cases this variation does not adversely affect the quality of the photograph but in other cases, such for instance as when operating over short focal distances, it is desirable to provide some form of compensation. It is accordingly within the scope of the present invention to adjust the position of the camera so that its distance from the said point of interest remains constant during the traverse of such camera, or to adjust the focussing of such camera. Assuming that the camera is mounted so that its optical axis is at right-angles to the line of traverse when such camera is in its mid-position then it will be at a minimum distance from the subject when it is in the said mid-position and at a maximum distance when it is in either of its end positions, and the aforesaid compensating means are accordingly disposed for reversing the direction of compensating movement of the camera or of the focussing mechanism as the camera moves through the mid-position of its lateral traverse.

In order that the present invention may be well understood I will now describe, by way of example only, one specific embodiment thereof with reference to the accompanying drawings in which:

Figure 1 is a plan view illustrating the principle of the present invention,

Figure 2 is a side sectional view of one form of apparatus,

Figure 3:
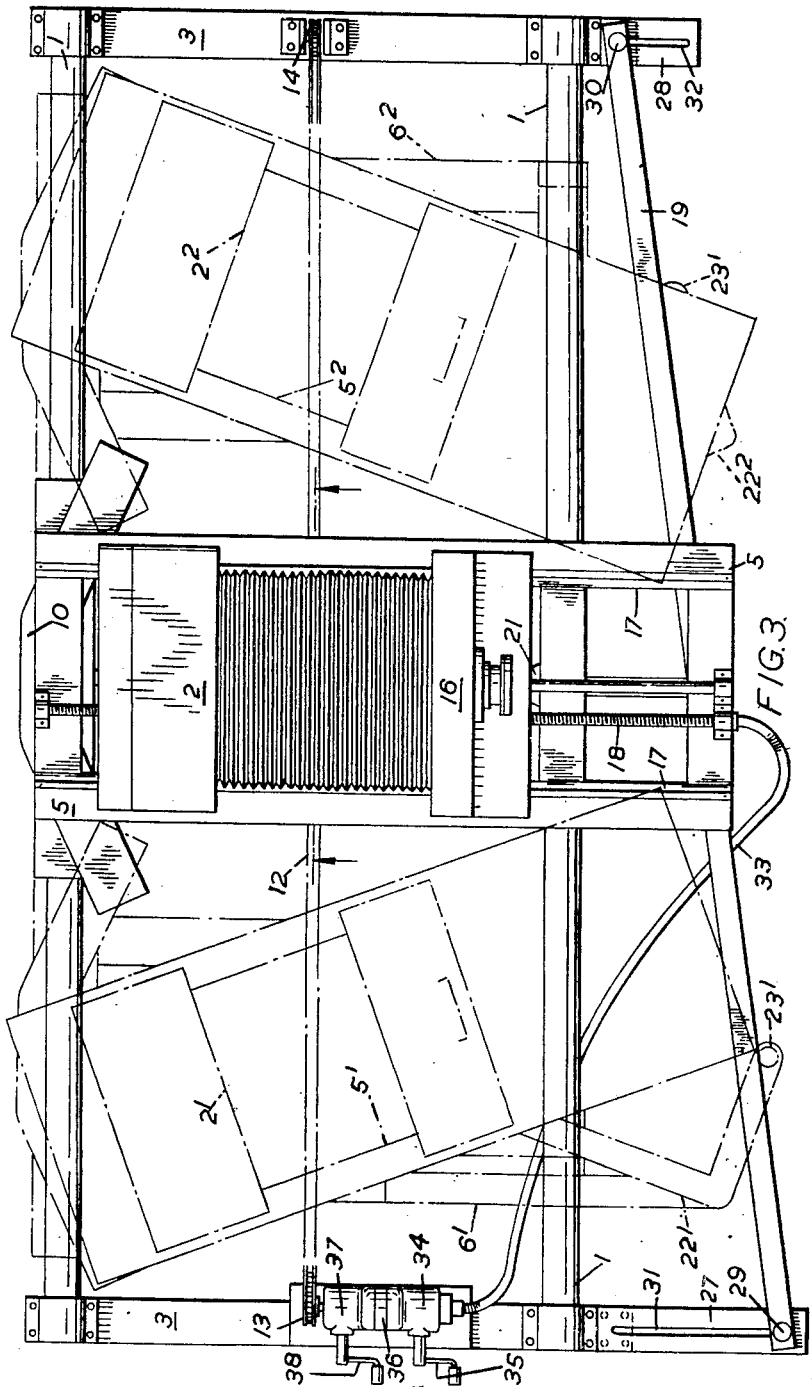
Figure 3 is a plan view of the apparatus shown in Figure 2.

Referring to the figures, the apparatus comprises a frame having longitudinal members 1, 1, of a length appropriate for accommodating the required lateral traverse of the camera 2, and any suitable end frames 3, the said end frames preferably being provided with adjustable feet 4.

The camera 2 is secured to a platform 5, and such platform is pivotally mounted on a carriage 6, the said carriage being slidable along the above mentioned members 1.

The said carriage and platform are in the form of frames made from wood but it is of course to be understood that they may be of other forms and be made from other material.

The carriage 6 is guided with respect to the members 1 by means of angle-plates 7, 7, and the camera platform 5 is restrained for the required pivotal movement by means of the pivot pin 8.

In order to afford appropriately rigid support for the camera 2 whilst at the same time avoiding any interference with the required pivotal movement, two rollers or castors 9, 9 are mounted on the underside of the rear of the camera platform 5 for cooperation with a guide plate 10 secured to the carriage 6, and a roller or castor 11 is mounted on the underside of the forward part of the platform 5 for cooperation with a guide formed by a transverse member of the carriage 6.

The carriage 6 is traversed along the member 1 by means of chain and sprocket mechanism, such mechanism comprising a chain 12 passing over a driving sprocket 13 at one side of the apparatus and over an idling sprocket 14, at the other side of such apparatus, the ends of said chain being secured to opposite sides of the said carriage. The chain 12 also passes over a guiding sprocket 15 located under the carriage 6.

The lens-carrying part 16 of the camera 2 is slidably mounted on guide rails 17 and can be caused to move along such rails for focussing purposes by means of a lead screw 18 engaging a nut mounted on the underside of the said part 16.

Rotary movement of the platform 5 is effected by means of link mechanism cooperating with a guide rail 19, the said link mechanism comprising a link 20 pivotally connected at one end to a lug 21 extending from the platform 5 and pivotally connected at the other end to the arm 22 of a bell-crank lever. The said bell-crank lever is pivotally mounted on the carriage 6 and its second arm is provided with a roller 23 for cooperation with the guide rail 19. In the arrangement shown the roller abuts against one edge of the guide rail 19 and a tension spring 24 is provided for resiliently biassing the bell-crank lever in a direction causing the roller 23 to follow the said rail. For the purpose of avoiding any objectionable back-lash and promoting ready response of the platform 5 to movements of the bell-crank lever induced by the roller 23 tending to follow the contour of the rail 19 further spring means, such as tension springs 25 and 26, may be provided for resiliently urging the platform in an angular direction opposite to that in which the bell-crank lever is itself biassed.

The guide rail 19 is secured at its ends to parts 27 and 28 projecting from the end members 3 of the frame of the machine, the connections comprising screwed studs or pins 29 and 30 extending through slots 31 and 32 in the said projections 27 and 28 respectively. In this way there is provision for varying the angularity of the rail 19 and consequently the angle through which the camera 2 is turned during its traverse. Assuming that the rail is set in the position shown in Figure 3 and that the carriage in making a full traverse moves from the position shown in chain lines and designated 6' to the position also shown in chain lines but designated $6^2$, then at the commencement of the traverse the camera 2 and platform 5 will occupy the positions shown in chain lines and designated 2' and 5' respectively, at the mid-point of the traverse the camera and platform will occupy the positions indicated in full lines, and at the end of the movement the said platform and camera will occupy the positions shown in chain lines and designated $2^2$ and $5^2$ respectively. In Figure 3 the carriage 6 and roller 23 are also shown in chain lines in the two limiting positions and designated 6', 23' and $6^2$, $23^2$, respectively.

In Figure 1 the camera 2 and platform 5 are shown in full lines in positions corresponding to those shown in Figure 3 and in chain lines in positions corresponding to the end positions shown in Figure 3. It will be observed from Figure 1 that the optical axis of the camera is always on a line passing through a point X, and in setting up the camera therefore the rail 19 is adjusted so that that point corresponds as closely as possible with the point of interest of the scene or subject to be photographed.

When the camera 2 is in its mid-position it is nearer to the subject than it is when in either of its end positions, and whilst in certain circumstances this variation does not lead to any appreciable defects in the photograph it may in other circumstances be desirable to provide compensation for such variation. It is accordingly within the scope of the present invention to provide means for automatically adjusting the focussing of the camera such as by changing the lens-to-film distance or by changing the position of the camera on its platform, the former method being in general preferable as it involves a movement which is smaller than that necessary for attaining equivalent compensation by movement of the camera as a whole. In Figure 3 there is shown one arrangement for effecting the said compensation by a focussing adjustment. In this arrangement the lead screw 18 is coupled by a flexible drive 33 to a differential gear box 34. One element of the said differential gear is coupled to a crank handle 35 and such handle can be adjusted for initially focussing the camera or for making independent adjustments during operation. Another element of the differential gearing is coupled through an electric motor 36 to the shaft of a gear box 37, the driving sprocket 13 of the chain 12 being keyed to this shaft. The gear box 37 is also provided with a crank handle 38 which can be coupled through suitable gearing with the said shaft.

The differential gear box 34 includes gearing for effecting a reversal of rotation of the flexible drive 33 when the camera 2 is in the mid-position of its traverse and it will be understood therefore that by traversing the camera either by rotating the crank handle 38 or by switching on the motor 36 the focussing of the camera can be automatically adjusted to compensate for variations in the distance of the camera from the subject being photographed.

Figure 4:
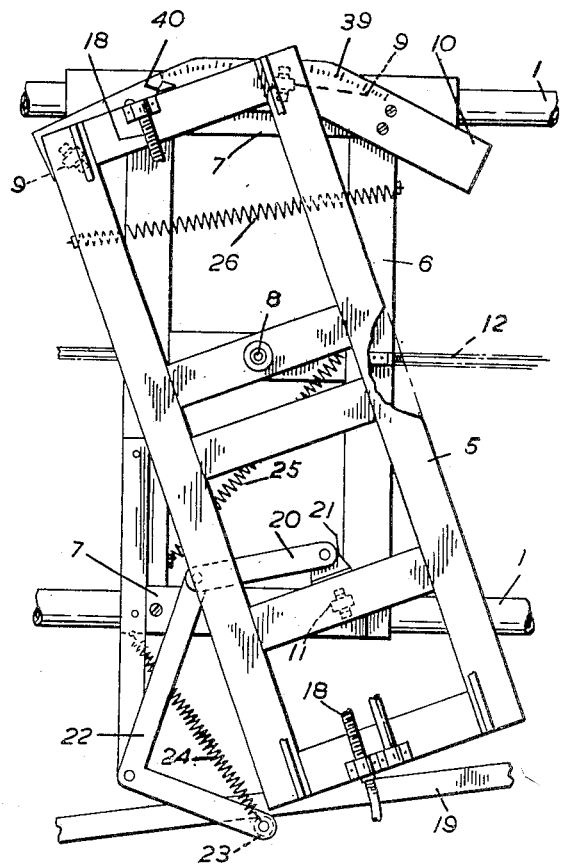
Figure 4 is a plan view of a part of the apparatus with the camera removed and the camera platform in one of its end positions.
Figure 5:
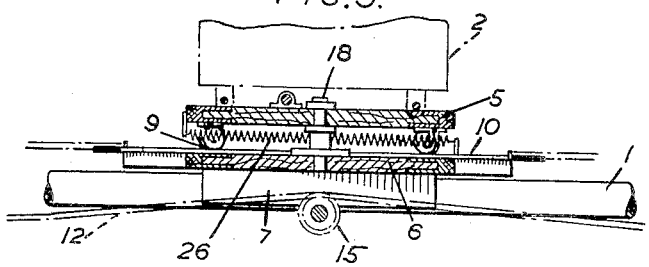
Figure 5 is a sectional view on the line V—V of Figure 2.

Any desired scales may be provided for facilitating the operation of setting-up the above described apparatus. Thus for instance as shown in Figure 4 the above mentioned guide plate 10 may be provided with graduations 39 for cooperation with a pointer 40 in assisting in setting the cam rail 19 in a position causing the platform 5 to adopt the required angular position for any given circumstances.

In general it is desirable that the optical axis of the camera should be at right-angles to the direction of traverse of the carriage when such carriage is in its mid-position and for this purpose the camera may be adjustably disposed on the above mentioned platform 5 or there may be adjustable link mechanism between the said platform and the cam rail 19.

As an alternative to providing the above described linkage for turning the carriage 6 I may provide suitably correlated but independent drives for the platform and for the carriage. Thus for instance I may provide independent electric motors for driving the carriage and the platform and one or both of such motors may be associated with means for controlling its speed of operation. In yet another arrangement I may employ two constant-speed motors, or a common drive, in conjunction with variable-ratio gearing in the transmission to the carriage and/or to the platform.

Whilst I have hereinbefore described some forms of mountings in accordance with the present invention I wish it to be understood that the specific details may be varied without departing from the scope thereof. Thus for instance the frame may be of any desired length or it may be of an adjustable nature so that in its application to a mounting for a stereoscopic camera there is provision for forming a stereoscopic base of various different lengths. Moreover such frame may be of a kind which can be readily dismantled for transport or storage purposes.

I claim:

A mounting for a camera of the kind suitable for taking photographs of the parallax panoramagram type, said mounting comprising a support, a carriage guided for linear movement across said support, a platform pivotally mounted on said carriage for angular movement in a horizontal plane and serving to carry a camera, means for positively moving said carriage throughout the whole of its lateral traverse in both directions, means for simultaneously turning said platform about its pivotal mounting in timed relation to movement of the carriage so that the optical axis of the camera always lies on a line passing through a common point, a lead screw adapted to be coupled to the camera for effecting focussing adjustment of the camera and a driving connection between said lead screw and said means for positively moving the carriage through its lateral traverse whereby during the said lateral traverse the focussing of the camera is adjusted to accommodate the variation in distance between the carriage and the said common point.

LESLIE PETER CLARENCE JACK DUDLEY.

REFERENCES CITED

The following references are of record in the file of this patent:

UNITED STATES PATENTS

| Number | Name | Date |
| --- | --- | --- |
| 2,342,737 | Jacobson | Feb. 29, 1944 |
| 2,400,455 | Donaldson | May 14, 1946 |
| 2,485,811 | Bonnet | Oct. 25, 1949 |